United States Patent
Das Purkayastha et al.

(10) Patent No.: US 11,733,919 B2
(45) Date of Patent: Aug. 22, 2023

(54) METHOD AND SYSTEM FOR OFFLOADING LOOKUP OPERATION TO NAND OFFLOAD APPARATUS

(71) Applicant: SAMSUNG ELECTRONICS CO., LTD., Suwon-si (KR)

(72) Inventors: Saugata Das Purkayastha, Bangalore (IN); Srikanth Tumkur Shivanand, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/036,872

(22) Filed: Sep. 29, 2020

(65) Prior Publication Data

US 2021/0109677 A1  Apr. 15, 2021

(30) Foreign Application Priority Data

Oct. 14, 2019 (IN) .............................. 201941041568
Jul. 29, 2020 (IN) .............................. 201941041568

(51) Int. Cl.
*G06F 3/06* (2006.01)
*G06F 12/02* (2006.01)

(52) U.S. Cl.
CPC ............ *G06F 3/0659* (2013.01); *G06F 3/061* (2013.01); *G06F 3/0679* (2013.01); *G06F 12/0292* (2013.01); *G06F 2212/2022* (2013.01)

(58) Field of Classification Search
CPC .... G06F 3/061; G06F 3/0659; G06F 12/0292; G06F 3/0679; G06F 12/0246;

(Continued)

(56) References Cited

U.S. PATENT DOCUMENTS

2008/0301397 A1* 12/2008 Goh ..................... G06F 12/0875
                                                        711/202
2015/0242124 A1*  8/2015 Law .................... G06F 12/0802
                                                        711/103

(Continued)

FOREIGN PATENT DOCUMENTS

EP          3 422 215 A1      1/2019

OTHER PUBLICATIONS

W. Cheong et al., "A flash memory controller for 15μs ultra-low-latency SSD using high-speed 3D NAND flash with 3μs read time," 2018 IEEE International Solid—State Circuits Conference—(ISSCC), San Francisco, CA, USA, 2018, pp. 338-340.*

(Continued)

*Primary Examiner* — Pierre Michel Bataille
(74) *Attorney, Agent, or Firm* — Sughrue Mion, PLLC

(57) ABSTRACT

A method for offloading a lookup operation to a NAND offload apparatus, including receiving, by the NAND offload apparatus, a NAND read command from a key-value solid-state drive (KV SSD) NAND interface, wherein the NAND offload apparatus is connected between the KV SSD NAND interface and a NAND device using a NAND bus; determining whether the NAND read command includes an information element indicating an indirect read operation; based on the NAND read command including the information element, performing the indirect read operation by the NAND offload apparatus; and based on the NAND read command not including the information element: passing, by the NAND offload apparatus, the NAND read command to the NAND device through the NAND bus, and configuring, by the NAND offload apparatus, a switch an output gate to pass a response message from the NAND device to the KV SSD NAND interface.

18 Claims, 9 Drawing Sheets

(58) Field of Classification Search
CPC ..... G06F 2212/2022; G06F 2212/7201; G06F 12/02; G06F 3/06
See application file for complete search history.

(56) References Cited

U.S. PATENT DOCUMENTS

| | | | | |
|---|---|---|---|---|
| 2018/0357234 A1* | 12/2018 | De | .......... | G06F 3/0679 |
| 2019/0155746 A1* | 5/2019 | Bhatia | ............... | G06F 12/1018 |
| 2019/0362081 A1* | 11/2019 | Kanno | ............... | G06F 21/602 |
| 2020/0301606 A1* | 9/2020 | Muthiah | ............... | G06F 3/0659 |

OTHER PUBLICATIONS

L. Zuolo, C. Zambelli, R. Micheloni and P. Olivo, "Solid-State Drives: Memory Driven Design Methodologies for Optimal Performance," in Proceedings of the IEEE, vol. 105, No. 9, pp. 1589-1608, Sep. 2017.*

* cited by examiner

FIG. 6

Level 1 table (DDR)

| IndRead (1 bit) | NAND page address |
|---|---|

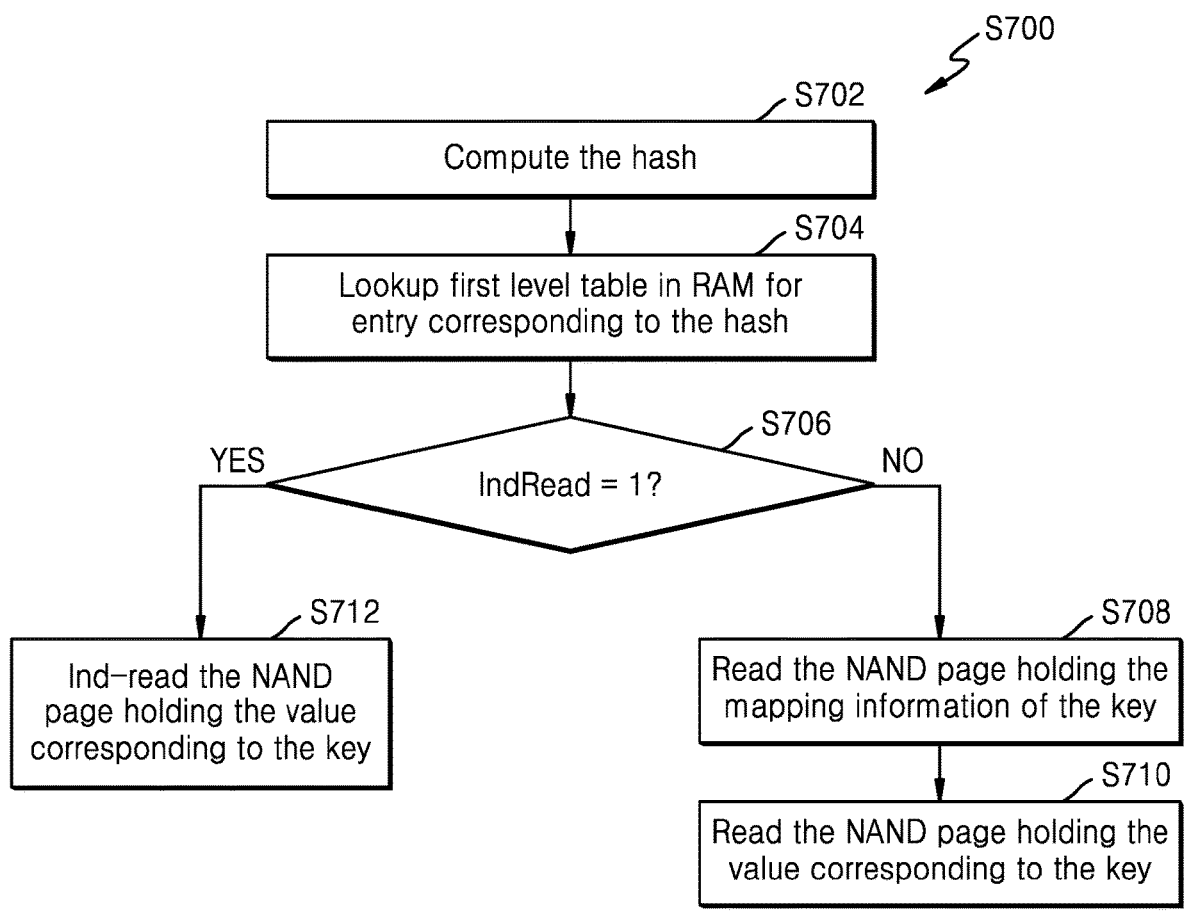

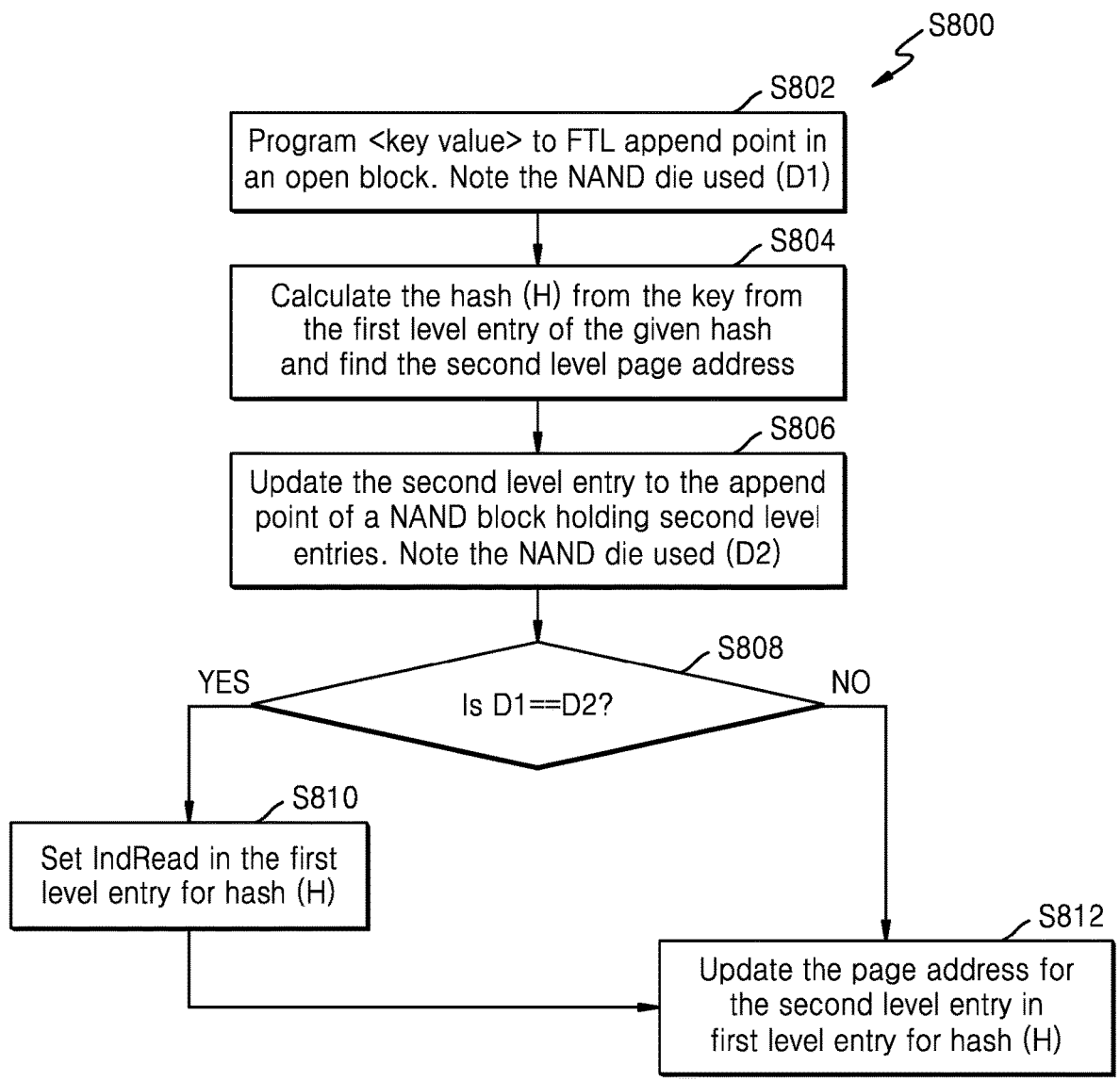

METHOD AND SYSTEM FOR OFFLOADING LOOKUP OPERATION TO NAND OFFLOAD APPARATUS

CROSS REFERENCE TO THE RELATED APPLICATION

The present application is based on, and claims priority under 35 U.S.C. § 119 to Indian Provisional Patent Application Number 201941041568 filed on Oct. 14, 2019, and Indian Non-Provisional Patent Application Number 201941041568 filed on Jul. 29, 2020, in the Indian Patent Office, the disclosures of which are incorporated by reference herein in their entireties.

BACKGROUND

1. Field

The present disclosure relates to a memory system, and more specifically related to a method and memory system for offloading a lookup operation to a NAND offload apparatus.

2. Description of Related Art

In general, an enterprise solid-state drive (SSD) supporting <key, value> based access, which may be referred to as key-value (KV) SSD, performs multiple levels of lookup based on the key to find the location in NAND memory, where the value corresponding to the key is stored. In an example, key and value may be terms used in a database. The key could be an employee number, and the value could be employee name, address etc. The <key> may be used to perform the lookup in the NAND memory. Each level of lookup may involve a transfer with the NAND, and processes within a SSD controller to search for the key and then perform the next level lookup in the NAND memory. Because the SSD may also be doing other operations in parallel, like garbage collection (GC) or input/output (IO) with other NAND dies, there may be latency introduced between each level of the lookup.

FIG. 1A illustrates an example scenario in which a KV read operation is explained. As shown in FIG. 1A, the method of <key, value> lookup may be explained based on hash. At operation S102, the KV SSD may receive a read request, from a processor (100), based on a key and compute the hash of the key. At operation S104, the KV SDD may perform a lookup in a first level table in a RAM based on the hash value. In embodiments, first level may refer to, for example, first level lookup or level-1 lookup. At operation S106, based on the NAND address found in the first level table lookup, the KV SSD may perform a NAND read operation of a page, which may be for example a second level entry, and a binary search for the key within the page. In embodiments, second level may refer to, for example, second level lookup or level-2 lookup. At operation S108, the KV SSD may perform a NAND read operation at the page address and offset identified at operation S106 and transfer <value>. Depending on the load in the SSD, the handling of the second level entry at operation S106 may be delayed and cause latency in overall <key, value> read.

FIG. 1B is a schematic view of a NAND device (200). The NAND device (200) may include a controller (202), a voltage selector (204), a NAND memory array (206), a latch (208), a column decoder (210), a NAND bus (212), and a row decoder (214). The controller (202) may include a read circuit (202a), a program circuit (204a) and an erase circuit (206a). The row decoder (214) and the column decoder (210) may be used to select a single row and at least one column of the NAND memory array (206) based upon an address applied to the NAND device (200).

The voltage selector (204) may be coupled to column lines corresponding to the columns of the NAND memory array (206) to supply the voltage levels on the addressed column lines corresponding to the data values stored in the NAND device (200). The NAND device (200) may be capable of performing write operations whereby data can be written to, for example programmed to or erased from, memory cells selected by a write address applied to the row and column decoders (214 and 210) during a write operation in the NAND device (200) using the program circuit (204a) and the erase circuit (206a). By using the read circuit (206a), a read operation can be used to retrieve data previously written to the NAND memory array (206) selected by a read address applied to the row and column decoders (214 and 210) during the read operation in the NAND device (210). The latch (208) may sense the data from the NAND memory array (206) of the selected row at a read operation and latch an n-bit data on the NAND bus (212) via the column decoder (210) at a program operation.

Thus, it is desired to address the above mentioned disadvantages or other shortcomings or at least provide a useful alternative.

SUMMARY

Provided is a method and memory system for offloading a lookup operation to a NAND offload apparatus.

Also provided is a method of receiving, by a NAND offload apparatus, a NAND read command from a key-value solid-state drive (KV SSD) NAND interface.

Also provided is the NAND offload apparatus placed on a NAND bus between the KV SSD NAND interface and a NAND device.

Also provided is a method of determining, by the NAND offload apparatus, whether the NAND read command includes an information element indicating an indirect read operation.

Also provided is a method of performing an indirect read operation by the NAND offload apparatus if the NAND read command includes the information element.

Also provided is a method of passing, by the NAND offload apparatus, the NAND read command to the NAND device through the NAND bus and configure, by the NAND offload apparatus, a switch to pass at an output gate response from the NAND device to the KV SSD NAND interface if the NAND read command does not includes the information element.

According to an embodiment, a method for offloading a lookup operation to a NAND offload apparatus includes receiving, by the NAND offload apparatus, a NAND read command from a key-value solid-state drive (KV SSD) NAND interface, wherein the NAND offload apparatus is connected between the KV SSD NAND interface and a NAND device using a NAND bus; determining, by the NAND offload apparatus, whether the NAND read command includes an information element indicating an indirect read operation; based on determining that the NAND read command includes the information element, performing the indirect read operation by the NAND offload apparatus; and based on determining that the NAND read command does not include the information element: passing, by the NAND offload apparatus, the NAND read command to the NAND device through the NAND bus, and configuring, by the NAND offload apparatus, a switch an output gate to pass a response message from the NAND device to the KV SSD NAND interface.

According to an embodiment, a NAND offload apparatus connected between a key-value solid-state drive (KV SSD) NAND interface and a NAND device using a NAND bus, includes a NAND offload controller; a key size register, connected to the NAND offload controller and configured to store a size of a key to be used for a lookup; a low density parity check (LDPC) engine connected to the NAND offload controller and configured to pull data from at least one NAND device; and a buffer RAM configured to store the data pulled by the LDPC engine, wherein the NAND offload controller is configured to pass input/output (IO) commands received from the KV SSD NAND interface to the NAND device, and to copy a response message received from the NAND device to the KV SSD NAND interface.

According to an embodiment, a memory system for offloading a lookup operation to a NAND offload apparatus includes a key-value solid-state drive (KV SSD) NAND interface; a NAND device; a NAND bus placed between the KV SSD NAND interface and the NAND device; and a NAND offload apparatus placed on the NAND bus, wherein the NAND offload apparatus includes a NAND offload controller configured to pass input/output (IO) commands from the KV SSD NAND interface to the NAND device, and to copy at least one response message received from the NAND device to the KV SSD NAND interface.

BRIEF DESCRIPTION OF FIGURES

Embodiments are illustrated in the accompanying drawings, throughout which like reference letters indicate corresponding parts in the various figures. The embodiments will be better understood from the following detailed description with reference to the drawings, in which:

FIG. 6 represents a first level table, according to an embodiment;

FIG. 7 is a flow diagram illustrating various operations for performing the lookup operation in a first level table and determining whether to issue indirect read or normal read, according to an embodiment; and FIG. 8 is a flow diagram illustrating a method for <key, value> insert operation during a writing operations, according to an embodiment.

DETAILED DESCRIPTION

Figure 1A:
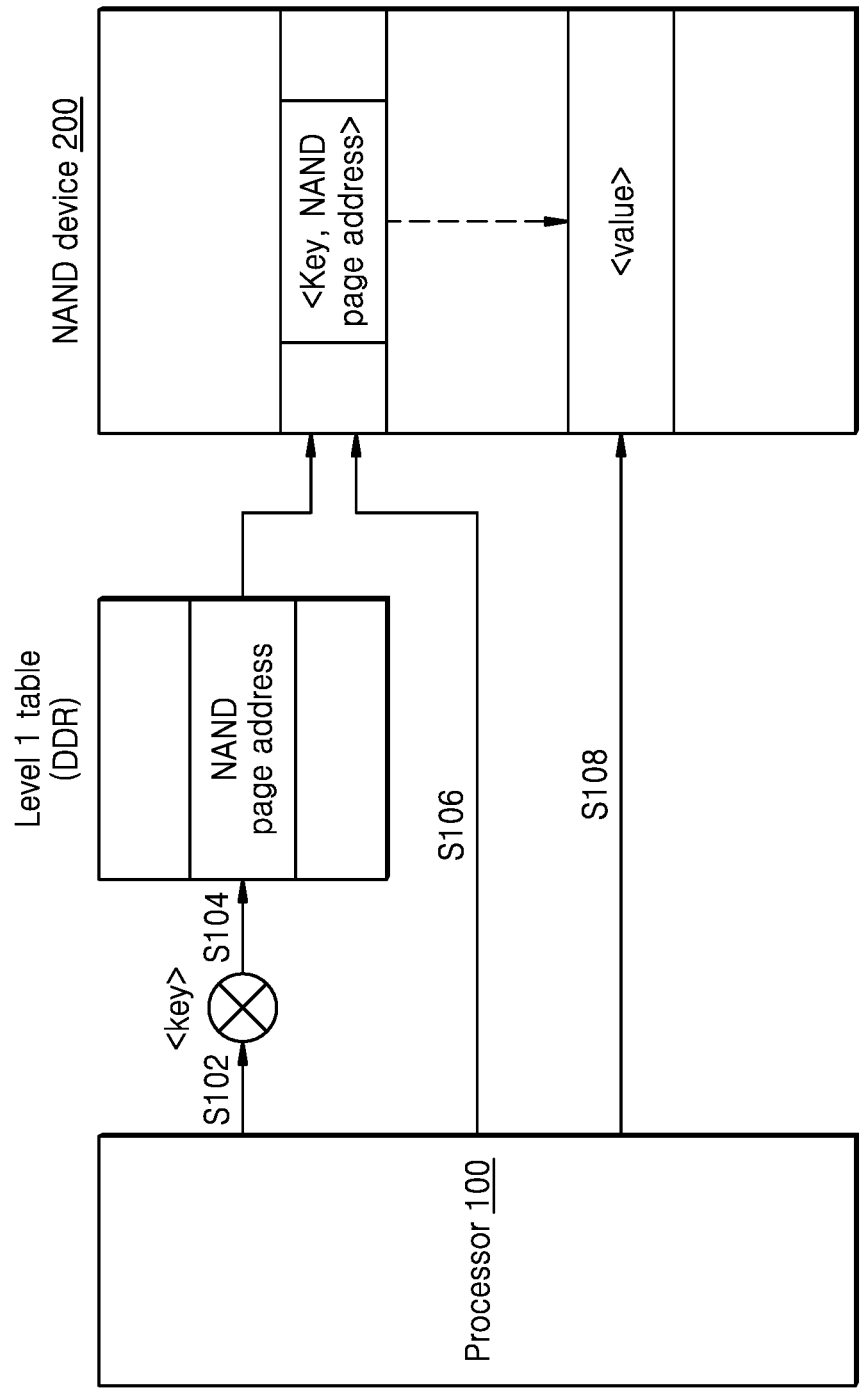
FIG. 1A is an example scenario in which a KV read operation is explained.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein disclose a method for offloading a lookup operation to a NAND offload apparatus. The method may include receiving, by the NAND offload apparatus, a NAND read command from a KV SSD NAND interface. The NAND offload apparatus may be placed on a NAND bus between the KV SSD NAND interface and a NAND device. Further, the method includes determining, by the NAND offload apparatus, whether the NAND read command includes an information element indicating an indirect read operation. Further, the method may include performing an indirect read operation by the NAND offload apparatus in response to determining that the NAND read command comprises the information element. Further, the method may include passing, by the NAND offload apparatus, the NAND read command to the NAND device through the NAND bus and configuring, by the NAND offload apparatus, a switch to pass at an output gate to pass response from the NAND device to the KV SSD NAND interface, in response to determining that the NAND read command does not include the information element.

Embodiments may be used to improve the latency of <key, value> lookup in KV implementation either in host or in SSD. Embodiments may be expanded to implement multiple hierarchy of lookup. Embodiments may be used to offload the lookup operation to the NAND offload apparatus without any overhead. Embodiments may be used to optimize the lookup operation by offloading it to the NAND offload apparatus on a NAND bus transparently and improve the <key, value> lookup latency. In an example, key and value may be terms used in a database. The key could be an employee number, and the value could be employee name, address etc. The key may be used to perform the lookup in the NAND device.

Figure 1B:
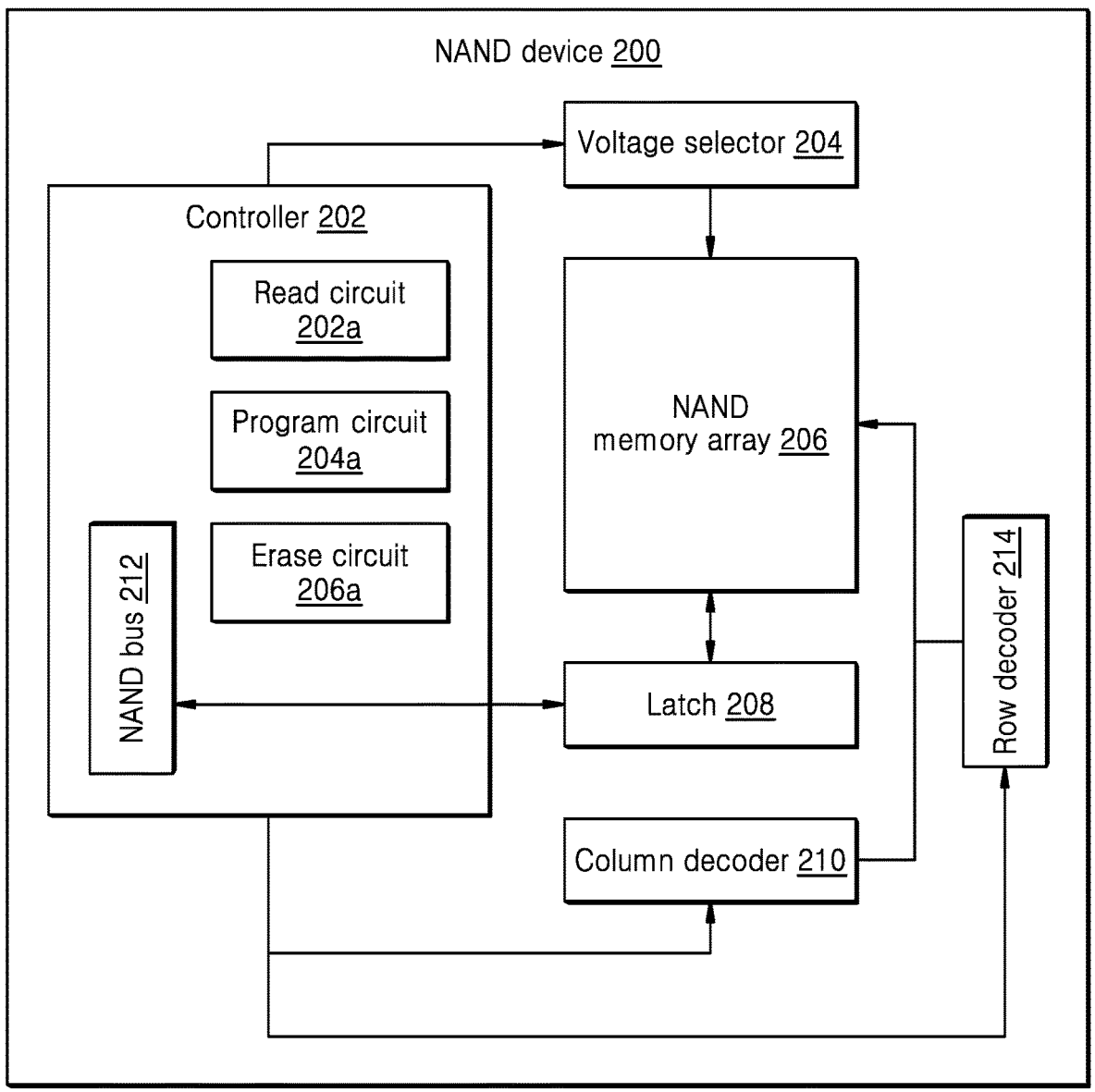
FIG. 1B is a schematic view of an example of a NAND device.
Figure 2:
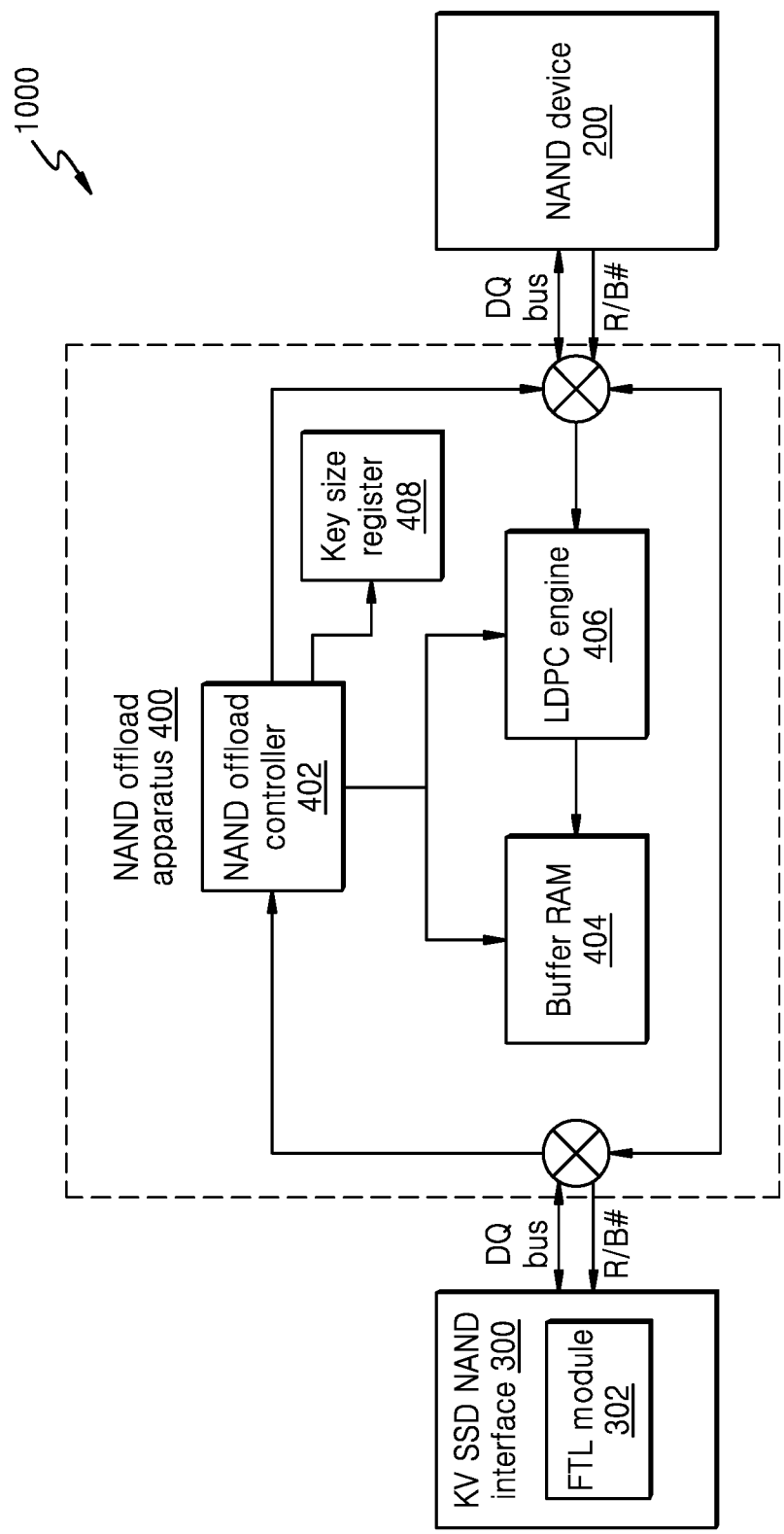
FIG. 2 is a schematic view of a memory system for offloading a lookup operation to a NAND offload apparatus, according to an embodiment.

FIG. 2 is a schematic view of a memory system (1000) for offloading a lookup operation to a NAND offload apparatus (400), according to an embodiment. In an embodiment, the memory system (1000) includes the NAND device (200), a KV SSD NAND interface (300) and a NAND offload apparatus (400). The operations and functions of the NAND device (200) may be similar to those described above with respect to FIG. 1B.

In an embodiment, the memory system (1000) includes a NAND bus placed between the KV SSD NAND interface (300) and the NAND device (200). The NAND offload apparatus (400) is placed on the NAND bus. The NAND offload apparatus (400) includes a NAND offload controller (402), a buffer RAM (404), a low-density parity check (LDPC) engine (406) and a key size register (408). The NAND offload controller (402) passes input/output (IO) commands from the KV SSD NAND interface (300) to the NAND device (200) and copies at least one response received from the NAND device (200) back to the KV SSD NAND interface (300).

The key size register (408) is connected to the NAND offload controller (402). The key size register (408) stores a size of a key to be used during a lookup. The LDPC engine (406) is connected to the NAND offload controller (402), where the LDPC engine (406) pulls data from the NAND device (200). The buffer RAM (404) stores the data pulled by the LDPC engine (406). The NAND offload controller (402) passes input/output (IO) commands received from the KV SSD NAND interface (300) to the NAND device (200) and copies responses received from the NAND device (200) back to the KV SSD NAND interface (300).

In an embodiment, the NAND offload controller (402) is configured to receive a NAND read command from the KV SSD NAND interface (300). After receiving the NAND read command from the KV SSD NAND interface (300), the NAND offload controller (402) is configured to determine whether the NAND read command includes an information element indicating an indirect read operation. In an embodiment, the information element is one-bit information configured in a first level table in a RAM to indicate whether a location of the information element is at the NAND device (200) where a second level entry is stored. In embodiments, first level may refer to, for example, first level lookup or level-1 lookup, and second level may refer to, for example, second level lookup or level-2 lookup.

In an embodiment, the NAND offload controller (402) is configured to compute a hash value from a key associated with the NAND read command and perform a lookup in the first level table in the buffer RAM (404) for a second level NAND page address corresponding to the hash value. Based on the lookup in the first level table in the buffer RAM (404) for the second level NAND page address corresponding to the hash value, the NAND offload controller (402) is configured to determine whether the NAND read command includes the information element based on the NAND page address.

In an embodiment, if the NAND read command includes the information element, the NAND offload controller (402) is configured to perform an indirect read operation.

In an embodiment, if the NAND read command does not include the information element, the NAND offload controller (402) is configured to pass the NAND read command to the NAND device (200) through the NAND bus and configure a switch to pass a response, through an output gate, from the NAND device (200) to the KV SSD NAND interface (300).

In an embodiment, the NAND read command is passed to the NAND device (200) through the NAND bus by reading a NAND page holding mapping information of a key associated with the NAND read command using a flash translation layer (FTL) module (302), reading the NAND page holding value corresponding to the key using the FTL module (302), and passing the NAND read command to the NAND device (200) through the NAND bus based on the value corresponding to the key.

In an embodiment, the NAND offload controller (402) is configured to receive the NAND read command from the KV SSD NAND interface (300). Further, the NAND offload controller (402) is configured to determine that the NAND read command is an indirect read command. Based on the determination, the NAND offload controller (402) is configured to modify the NAND read command to a normal NAND read command and send the normal read command to the NAND device (200). Based on the normal read command, the NAND offload controller (402) is configured to receive a response message from the NAND device (200) based on the normal read command. Further, the NAND offload controller (402) is configured to store the response message in the buffer RAM (404). Further, the NAND offload controller (402) is configured to search for a key within a NAND page stored in the buffer RAM (404) for next level mapping. Further, the NAND offload controller (402) is configured to send a NAND read command to the NAND device (200) at the location identified by the next level mapping. Further, the NAND offload controller (402) is configured to forward the response message to the KV SSD NAND interface (300) from the NAND device (200).

In an embodiment, the NAND offload controller is configured to program a key and a value to a an FTL module (302) append point in an open block. Further, the NAND offload controller is configured to compute a hash value from the key and determine a page address of a second level table. Further, the NAND offload controller is configured to update an entry of second level table to the append point of a NAND block holding the entry of the second level table. Further, the NAND offload controller is configured to determine whether the NAND die where the key and value was programmed is the same as the NAND die where the second level table is programmed. Further, the NAND offload controller is configured to determine whether a bit to be set is in the same NAND die. If the bit to be set is in the same NAND die, the NAND offload controller is configured to set a first level entry for a hash value corresponding to the key. Further, the NAND offload controller is configured to update a page address for a second level entry in a first level entry for hash value, when the bit IndRead in the first level table is set if both the second level entry and <key, value> mapping are in the same NAND die. The first level table may be updated to point to the second level entry.

An indirect read command may be handled by an offload controller as described below, according to an embodiment.

In an embodiment, the NAND offload controller (402) sits on the NAND bus between the KV SSD NAND interface (300) and the NAND device (200). It is possible to have all NAND devices, which may be for example NAND dies, on a given NAND channel connect with a single NAND offload controller. For simplicity of explanation one NAND device (200) will be described as being managed by one NAND offload controller. All NAND 10 operation to the NAND device goes through the NAND offload controller (402), which passes the command to the NAND device (200), and copies the response from the NAND device (200) back to the KV SSD NAND interface (300).

Although FIG. 2 shows various hardware components of the memory system (1000) it is to be understood that other embodiments are not limited thereto. In other embodiments, the memory system (1000) may include less or more number of components. Further, the labels or names of the components are used only for illustrative purpose and do not limit the present scope. One or more components can be combined together to perform same or substantially similar function to offload the lookup operation to the NAND offload apparatus (400).

Figure 3:
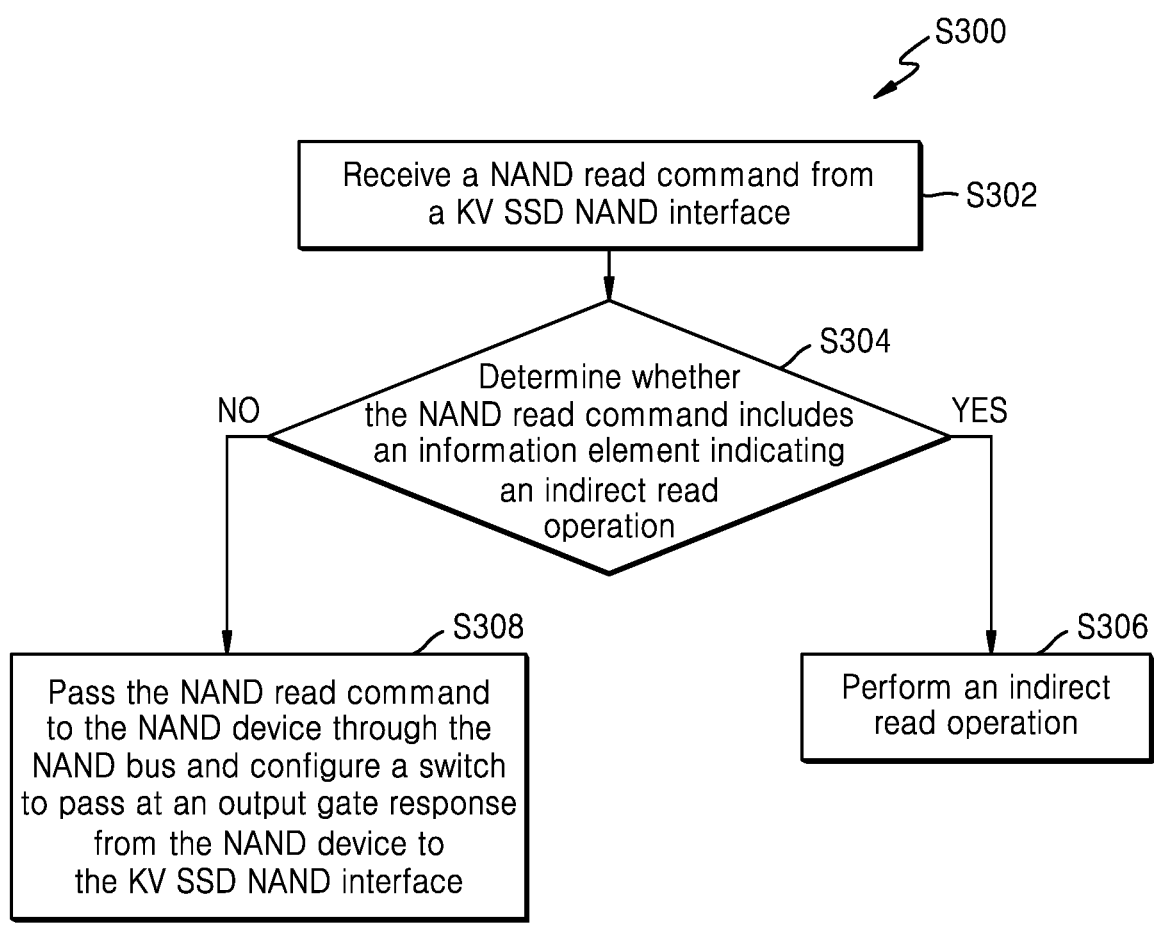
FIG. 3 is an example flow diagram illustrating a method for handling an indirect read operation for a NAND offload controller, according to an embodiment.

FIG. 3 is an example flow diagram illustrating a method (S300) for handling indirect read for offload controller, according to an embodiment. The operations (S302-S308) are performed by the NAND offload apparatus (400). At operation S302, the method includes receiving the NAND read command from the KV SSD NAND interface (300). At operation S304, the method includes determining whether the NAND read command includes the information element indicating the indirect read operation. If the NAND read command includes the information element indicating an indirect read operation then, at operation S306, the method includes performing the indirect read operation. If the NAND read command does not include the information element indicating the indirect read operation then, at operation S308, the method includes passing the NAND read command to the NAND device (200) through the NAND bus and configuring a switch to pass at an output gate the response from the NAND device (200) to the KV SSD NAND interface (300).

Figure 4:
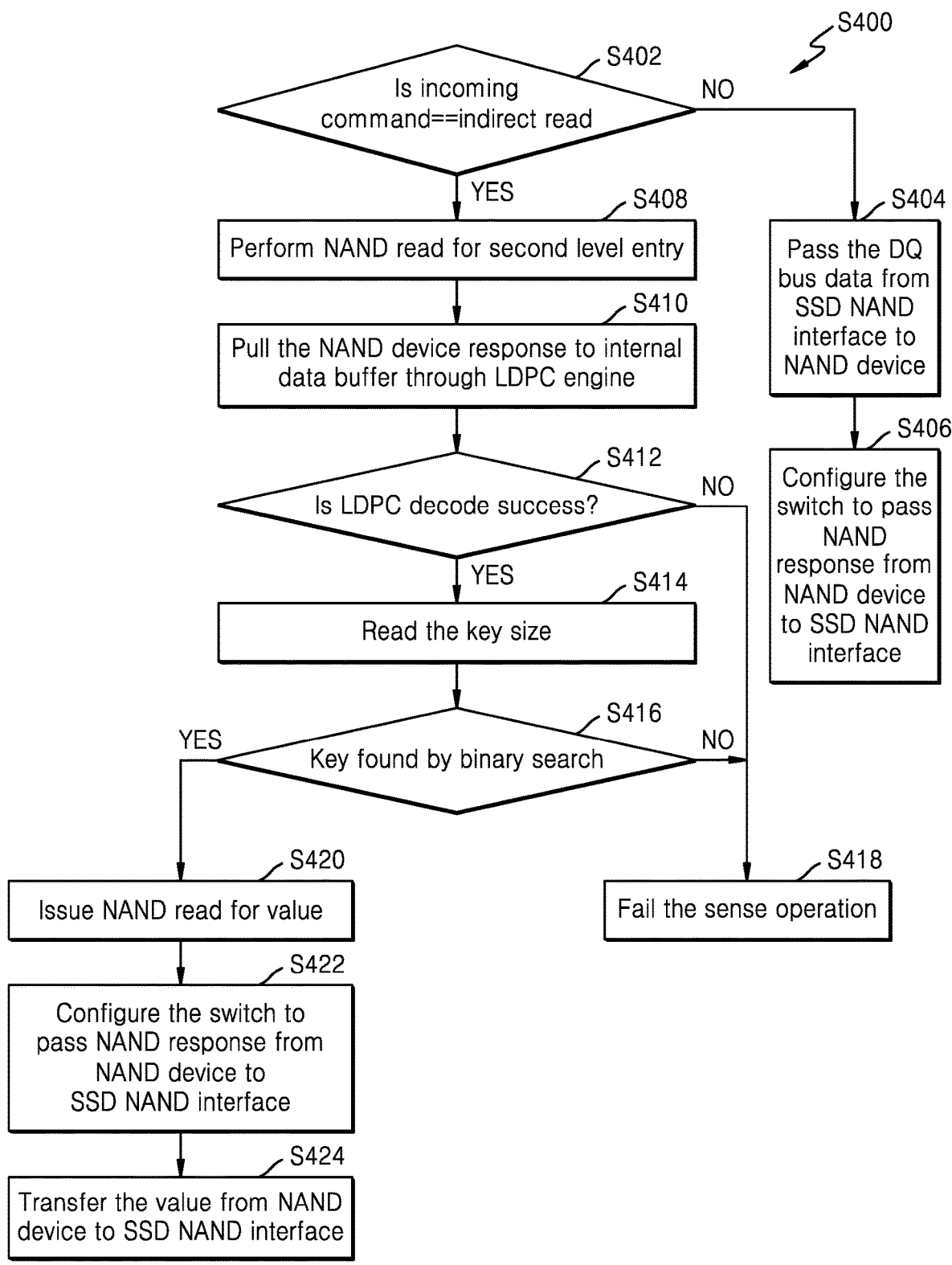
FIG. 4 is an example flow diagram illustrating a method for handling an indirect read operation for the NAND offload controller, according to an embodiment.

FIG. 4 is an example flow diagram illustrating a method (S400) for handling an indirect read operation for the NAND offload controller (402), according to an embodiment. The steps and operations may be similar to those described in FIG. 2. In embodiments, if either the LDPC decode fails or key is not found during binary search in the key-latch, then the sense operation may be failed by the NAND offload controller (402).

At operation S402, the method includes determining whether the incoming command is an indirect read command. If the incoming command is not an indirect read command then, at operation S404, the method includes passing the DQ bus data from the KV SSD NAND interface (300) to the NAND device (200). At operation S406, the method includes configuring the switch to pass NAND response from the NAND device (200) to the KV SSD NAND interface (300).

If the incoming command is an indirect read command, then at operation S408 the method includes performing the NAND read for second level entry. At operation S410, the method includes pulling the NAND device response through the LDPC engine (406) to the buffer RAM (404). At operation S412, the method includes determining whether the LDPC decode is successful. If the LDPC decode is not successful, then at operation S418 the method includes failing the sense operation. If the LDPC decode is successful, then at operation S414 the method includes reading the key size. At operation S416, the method includes determining whether the key is found by using a binary search. If the key is not found by using the binary search, then at operation S418 the method includes failing the sense operation.

If the key is found by using the binary search, then at operation S420 the method includes issuing a NAND read for the value. At operation S422, the method includes configuring the switch to pass the NAND response from the NAND device (200) to the KV SSD NAND interface (300). At operation S424, the method includes transferring the value from the NAND device (200) to the KV SSD NAND interface (300).

Figure 5:
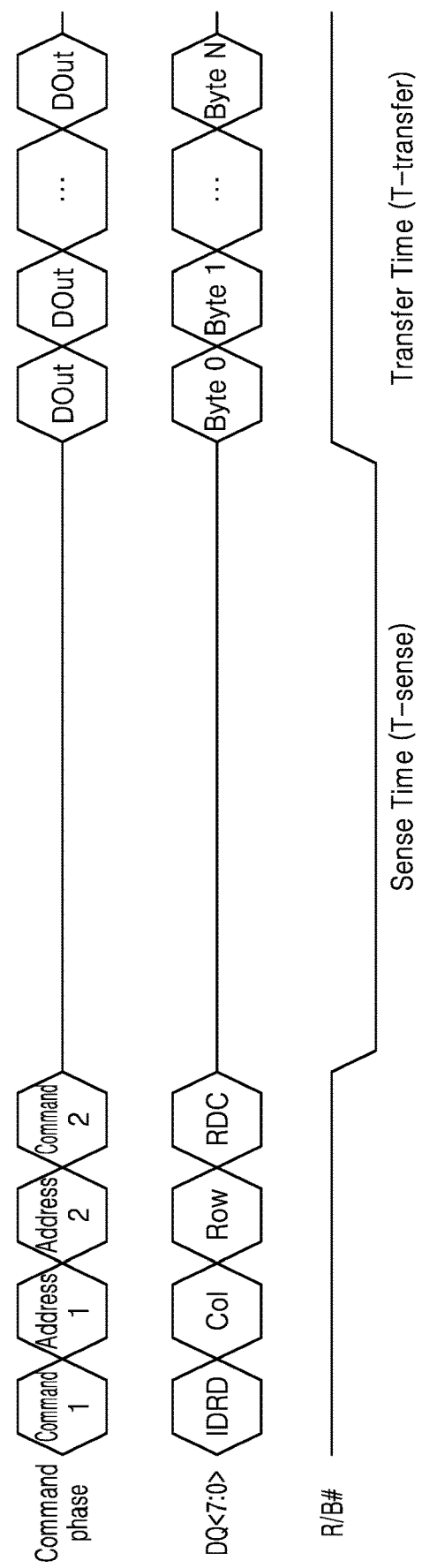
FIG. 5 is a timing diagram illustrating a KV read operation on NAND device, according to an embodiment.

FIG. 5 is a timing diagram indicating the KV read operation on NAND device (200), according to an embodiment. The transaction as seen by the KV SSD NAND interface (300) is shown in FIG. 5. After the indirect read operation command is issued, the KV SSD NAND interface finds the NAND device (200), which may be for example a NAND die, is busy. During this time, the NAND offload controller (402) may perform intermediate level lookup. When the ready is enabled, it signals that the value is available in the NAND latch and can be pulled out. Further, DQ<7:0>: represents the data bus, which is used to carry NAND commands+address from a processor (100) to NAND device (200) and data to/from the processor (100) and the NAND device (200). Further, R/B: it is a signal from the NAND device (200) to the processor (100) indicating whether the NAND device (200) is currently busy. When the NAND device (200) is busy, the processor (100) should not send new command.

The command phase shown is not separate signal. The transfer on the DQ bus happens in multiple phases. The command phase shows the state of the transfer. At the beginning, the processor (100) will send the command and address information to the NAND device (200). The address information is composed on Row and Column numbers of NAND memory cells. The command and address is passed over the DQ bus. Once the NAND device (200) receives the command, the NAND device (200) indicates busy signal to the processor (100). When busy signal is turned off, the processor (100) can take the data out, shown as <DOut>.

FIG. 7 is a flow diagram illustrating a method (S700) for performing a lookup operation in a first level table and determining whether to issue indirect read or normal read, according to an embodiment. The operations (S702-710) may be performed by the flash translation layer (FTL) module (302) running in the KV SSD NAND interface (300).

The method S700 can be used to introduce one bit (IndRead) in the first level table, which indicates whether the location of the value is at the same NAND die where the second level entry is stored. The presence of this bit indicates whether an indirect read operation can be performed or not as shown in FIG. 7.

At operation S702, the method includes computing the hash. At 704, the method includes providing a first level table in the RAM for entry corresponding to the hash. At operation S706, the method includes determining whether the IndRead is 1. If the IndRead is 1, then at operation S712 the method includes performing an indirect read of the NAND page holding the value corresponding to the key. If the IndRead is not equal to 1, then at operation S708 the method includes reading the NAND page holding the mapping information of the key. At operation S710, the method includes reading the NAND page holding the value corresponding to the key.

FIG. 8 is a flow diagram illustrating a method (S800) for performing a <key, value> insert operation during a writing operations, according to an embodiment. In embodiments, the IndRead bit may be included in a level 1 table, as illustrated for example in FIG. 6. This bit may be set if the level 2 entry and value are in the same die. This may be identified during the insert operation of <key, value>. FIG. 8 illustrates an insert process referring to FIG. 8. In order to receive the benefits of the indirect read operation, the FTL module (302) may maintain an open block for storing the value and the corresponding level 2 entry, which may correspond to, for example, metadata, in the same NAND die as much as possible.

At operation S802, the method includes programing <key, value> to the FTL module (302) append point in an open block. During this operation, the NAND die used, for example die D1, may be noted. At operation S804, the method includes calculating the hash (H) from the key from the first level entry of the given hash and finding the second level page address. At operation S806, the method includes updating the second level entry to the append point of the NAND block holding second level entries. During this operation, the NAND die used, for example die D2, may be noted. At operation S808, the method includes determining whether D1=D2. If D1=D2, then at operation S810 the method includes setting IndRead in the first level entry for the hash (H). At operation 812, the method includes updating the page address for the second level entry in the first level entry for hash (H).

The various actions, acts, blocks, steps, or the like discussed above, for example methods (S300, S400, S700 and S800) may be performed in the order presented, in a different order or simultaneously. Further, in some embodiments, some of the actions, acts, blocks, steps, or the like may be omitted, added, modified, skipped, or the like without departing from the present scope.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for offloading a lookup operation to a NAND offload apparatus, comprising:
receiving, by the NAND offload apparatus, a NAND read command from a key-value solid-state drive (KV SSD) NAND interface, wherein the NAND offload apparatus is connected between the KV SSD NAND interface and a NAND device using a NAND bus;
determining, by the NAND offload apparatus, whether the NAND read command includes an information element indicating an indirect read operation;
based on determining that the NAND read command includes the information element, performing the indirect read operation by the NAND offload apparatus; and
based on determining that the NAND read command does not include the information element:
passing, by the NAND offload apparatus, the NAND read command to the NAND device through the NAND bus, and
configuring, by the NAND offload apparatus, a switch to pass at an output gate a response message from the NAND device to the KV SSD NAND interface,
wherein the information element comprises one-bit information included in a first level table in a random access memory (RAM), and
wherein the information element indicates whether the information element is located at the NAND device where a second level entry is stored.

2. The method as claimed in claim 1, further comprising:
computing, by the NAND offload apparatus, a hash value from a key associated with the NAND read command;
performing, by the NAND offload apparatus, a lookup in the first level table in the RAM for a second level NAND page address corresponding to the hash value; and
determining, by the NAND offload apparatus, whether the NAND read command comprises the information element based on the second level NAND page address.

3. The method as claimed in claim 1, further comprising:
reading, by a flash translation layer (FTL) module included in the KV SSD NAND interface, a NAND page holding mapping information of a key associated with the NAND read command;
reading, by the FTL module, the NAND page holding a value corresponding to the key; and
passing, by the FTL module, the NAND read command to the NAND device through the NAND bus based on the value corresponding to the key.

4. The method of claim 1, further comprising:
receiving, by the NAND offload apparatus, the NAND read command from the KV SSD NAND interface;
determining, by the NAND offload apparatus, that the NAND read command is an indirect read command;
modifying, by the NAND offload apparatus, the NAND read command to a normal read command;
sending, by the NAND offload apparatus, the normal read command to the NAND device;
receiving, by the NAND offload apparatus, the response message from the NAND device based on the normal read command;
storing, by the NAND offload apparatus, the response message in a buffer RAM;
searching, by the NAND offload apparatus, for a key within a NAND page stored in the buffer RAM for next level mapping;
sending, by the NAND offload apparatus, the NAND read command to the NAND device at a location identified by the next level mapping; and
forwarding, by the NAND offload apparatus, the response message to the KV SSD NAND interface from the NAND device.

5. The method of claim 1, wherein the information element is stored in a first level entry corresponding to a key associated with the NAND read command, wherein the first level entry specifies the second level entry corresponding to the key, and wherein the information element indicates whether a value corresponding to the key is stored at the NAND device where the second level entry is stored.

6. A method for offloading a lookup operation to a NAND offload apparatus, comprising:

receiving, by the NAND offload apparatus, a NAND read command from a key-value solid-state drive (KV SSD) NAND interface, wherein the NAND offload apparatus is connected between the KV SSD NAND interface and a NAND device using a NAND bus;

determining, by the NAND offload apparatus, whether the NAND read command includes an information element indicating an indirect read operation;

based on determining that the NAND read command includes the information element, performing the indirect read operation by the NAND offload apparatus; and based on determining that the NAND read command does not include the information element:
passing, by the NAND offload apparatus, the NAND read command to the NAND device through the NAND bus, and
configuring, by the NAND offload apparatus, a switch to pass at an output gate a response message from the NAND device to the KV SSD NAND interface;

programming a key and a value to an append point of a Flash Translation Layer (FTL) module in an open block;

computing a hash value from the key;

determining a page address of a second level table;

updating an entry of the second level table to an append point of a NAND block holding the entry of the second level table;

determining whether the key and the value are included in a same die as the second level table;

based on the key and the value being included in the same die as the second level table, setting a bit in an entry of a first level table for the hash value; and based on the key and the value not being included in the same die as the second level table, updating the page address of the second level table in the entry of the first level table.

7. A NAND offload apparatus connected between a key-value solid-state drive (KV SSD) NAND interface and a NAND device using a NAND bus, the NAND offload apparatus comprising:

a NAND offload controller;

a key size register, connected to the NAND offload controller and configured to store a size of a key to be used for a lookup;

a low density parity check (LDPC) engine connected to the NAND offload controller and configured to pull data from at least one NAND device; and a buffer RAM configured to store the data pulled by the LDPC engine, wherein the NAND offload controller is configured to pass input/output (IO) commands received from the KV SSD NAND interface to the NAND device, and to copy a response message received from the NAND device to the KV SSD NAND interface, and wherein the NAND offload controller is further configured to:
receive a NAND read command from the KV SSD NAND interface;

determine whether the NAND read command includes an information element indicating an indirect read operation;

based on determining that the NAND read command includes the information element, perform the indirect read operation, and based on determining that the NAND read command does not include the information element, pass the NAND read command to the NAND device through the NAND bus, and configure a switch to pass at an output gate the response message from the NAND device to the KV SSD NAND interface.

8. The NAND offload apparatus as claimed in claim 7, wherein the information element comprises one-bit information included in a first level table in a random access memory (RAM), and wherein the information element indicates whether the information element is located at the NAND device where a second level entry is stored.

9. The NAND offload apparatus as claimed in claim 7, wherein the NAND offload controller is further configured to:

compute a hash value from the key associated with the NAND read command;

perform the lookup in a first level table in a random access memory (RAM) for a second level NAND page address corresponding to the hash value; and determine whether the NAND read command comprises the information element based on the second level NAND page address.

10. The NAND offload apparatus as claimed in claim 7, wherein the NAND offload controller is further configured to:

read a NAND page holding mapping information of the key associated with the NAND read command;

read the NAND page holding a value corresponding to the key; and pass the NAND read command to the NAND device through the NAND bus based on the value corresponding to the key.

11. The NAND offload apparatus as claimed in claim 7, wherein the NAND offload controller is further configured to:

receive the NAND read command from the KV SSD NAND interface;

determine that the NAND read command is an indirect read command;

modify the NAND read command to a normal NAND read command;

send the normal NAND read command to the NAND device;

receive the response message from the NAND device based on the normal NAND read command;

store the response message in the buffer RAM;

search for the key within a NAND page stored in the buffer RAM for next level mapping;

send the NAND read command to the NAND device at a location identified by the next level mapping; and forward the response message to the KV SSD NAND interface from the NAND device.

12. The NAND offload apparatus as claimed in claim 7, wherein the NAND offload controller is further configured to:

program the key and a value to a an append point of a Flash Translation Layer (FTL) module in an open block;

compute a hash value from the key;

determine a page address of a second level table;
update an entry of the second level table to an append point of a NAND block holding the entry of the second level table;
determining whether the key and the value are included in a same die as the second level table;
based on the key and the value being included in the same die as the second level table, set a bit in an entry of a first level table for the hash value; and
based on the key and the value not being included in the same die as the second level table, update the page address for the second level table in the entry of the first level table.

13. A memory system for offloading a lookup operation to a NAND offload apparatus, comprising:
a key-value solid-state drive (KV SSD) NAND interface comprising a flash translation layer;
a NAND device;
a NAND bus placed between the KV SSD NAND interface and the NAND device; and
a NAND offload apparatus placed on the NAND bus, wherein the NAND offload apparatus comprises a NAND offload controller configured to pass input/output (IO) commands from the KV SSD NAND interface to the NAND device, and to copy at least one response message received from the NAND device to the KV SSD NAND interface, and
wherein the NAND offload controller is configured to:
receive a NAND read command from the KV SSD NAND interface;
determine whether the NAND read command includes an information element indicating an indirect read operation;
based on determining that the NAND read command includes the information element, perform the indirect read operation, and
based on determining that the NAND read command does not include the information element, pass the NAND read command to the NAND device through the NAND bus, and configure a switch to pass at an output gate a response message from the NAND device to the KV SSD NAND interface.

14. The memory system of claim 13, wherein the information element comprises one-bit information included in a first level table in a random access memory (RAM), and
wherein the information element indicates whether the information element is located at the NAND device where a second level entry is stored.

15. The memory system of claim 13, wherein the NAND offload controller is further configured to:
compute a hash value from a key associated with the NAND read command;
perform a lookup in a first level table in a random access memory (RAM) for a second level NAND page address corresponding to the hash value; and
determine whether the NAND read command comprises the information element based on the second level NAND page address.

16. The memory system of claim 13, wherein the NAND offload controller is further configured to:
read a NAND page holding mapping information of a key associated with the NAND read command;
read the NAND page holding a value corresponding to the key; and
pass the NAND read command to the NAND device through the NAND bus based on the value corresponding to the key.

17. The memory system of claim 13, wherein the NAND offload controller is further configured to:
receive the NAND read command from the KV SSD NAND interface;
determine that the NAND read command is an indirect read command;
modify the NAND read command to a normal NAND read command;
send the normal NAND read command to the NAND device;
receive the response message from the NAND device based on the normal NAND read command; and
store the response message in a buffer RAM;
search for a key within a NAND page stored in the buffer RAM for next level mapping;
send the NAND read command to the NAND device at a location identified by the next level mapping; and
forward the response message to the KV SSD NAND interface from the NAND device.

18. A memory system for offloading a lookup operation to a NAND offload apparatus, comprising:
a key-value solid-state drive (KV SSD) NAND interface;
a NAND device;
a NAND bus placed between the KV SSD NAND interface and the NAND device; and
a NAND offload apparatus placed on the NAND bus, wherein the NAND offload apparatus comprises a NAND offload controller configured to pass input/output (IO) commands from the KV SSD NAND interface to the NAND device, and to copy at least one response message received from the NAND device to the KV SSD NAND interface,
wherein the NAND offload controller is configured to:
receive a NAND read command from the KV SSD NAND interface;
determine whether the NAND read command includes an information element indicating an indirect read operation;
based on determining that the NAND read command includes the information element, perform the indirect read operation,
based on determining that the NAND read command does not include the information element, pass the NAND read command to the NAND device through the NAND bus, and configure a switch to pass at an output gate a response message from the NAND device to the KV SSD NAND interface,
program a key and a value to an append point of a Flash Translation Layer (FTL) module in an open block;
compute a hash value from the key;
determine a page address of a second level table;
update an entry of the second level table to an append point of a NAND block holding the entry of the second level table;
determine whether the key and the value are included in a same die as the second level table;
based on the key and the value being included in the same die as the second level table, set a bit in an entry of a first level table for the hash value; and
based on the key and the value not being included in the same die as the second level table, update the page address for the second level table in the entry of the first level table.

* * * * *